United States Patent [19]
Carre et al.

[11] 4,121,500
[45] Oct. 24, 1978

[54] HYDRAULIC AMPLIFIER

[75] Inventors: Jean-Jacques Carré, Montreuil; Yves Meyer, Taverny, both of France

[73] Assignee: Societe Anonyme D.B.A., Paris, France

[21] Appl. No.: 757,730

[22] Filed: Jan. 7, 1977

[30] Foreign Application Priority Data

Jan. 16, 1976 [FR] France .................................. 76 01076

[51] Int. Cl.² ........................................... F15B 13/10
[52] U.S. Cl. ................................... 91/391 R; 91/457
[58] Field of Search ..................... 91/391 R, 457, 454

[56] References Cited
FOREIGN PATENT DOCUMENTS 2,362,350  6/1974  Fed. Rep. of Germany ........ 91/391 R
2,303,185  1/1976  France ................................. 91/391 R

*Primary Examiner*—Paul E. Maslousky
*Attorney, Agent, or Firm*—Paul David Schoenle; Ken C. Decker

[57] ABSTRACT

A hydraulic amplifier comprising a housing wherein is defined a pressure chamber. A servo piston is slidable in a bore opening onto the pressure chamber. The amplifier also comprises a set of control valve connectible to a high pressure fluid source and a low pressure reservoir. An operator operated control rod has one end projecting into the chamber. In the pressure chamber is mounted a lever mechanism comprising a lever having one end pivoted on a pin associated with the housing, and the other end is moved by the control rod. The lever mechanism also comprises a rocker member which is pivoted on the lever and whose respective ends can bear on the servo piston and are adapted to move at least one valve in the control valve set. The pin is slidable relative to the housing and is urged by resilient means into an idle position. The control valve set comprises an exhaust valve operated by a rocker member, and a high pressure valve operated in response to the movement of the pin from its idle position.

7 Claims, 3 Drawing Figures

HYDRAULIC AMPLIFIER

The invention relates to a hydraulic amplifier, more particularly for use in a power-assisted brake circuit for a motor vehicle.

The French patent application published under No. 2 164 511, in particular, reveals a hydraulic amplifier of the type comprising a housing containing a pressure chamber, a servo piston slidable in a bore giving onto this chamber, a set of control valves connectible to a pressure fluid source and a low pressure reservoir, a control rod which is operated by an operator and of which one end projects into the chamber, a lever mechanism situated in the pressure chamber and comprising, firstly, a lever of which one end is pivoted on a pin associated with the housing and the other end is moved by the control rod and, secondly, a rocker member which is pivoted on the lever and of which respective ends can bear on an element of the control valve set and on the servo piston, the pin being slidable relative to the housing and being urged by resilient means into an idle position which is fixed relative to the housing. In this known device the control valve set is formed by a single spool which is moved by the end of the rocker member and which fulfils a dual role, acting as an exhaust valve and a high pressure valve. During operation of the hydraulic amplifier, the spool performs small reciprocating movements to enable the high pressure fluid to enter the pressure chamber. These movements are transmitted to that portion of the spool acting as an exhaust valve and eventually produce premature wear on this portion of the spool. This makes leakage likely to occur at the exhaust valve. One of the objects of the invention is to dissociate the exhaust valve from the high pressure valve in order to eliminate this disadvantage.

According to the invention, the hydraulic amplifier defined above is characterised in that the control valve set comprises an exhaust valve operated by the rocker member and a high pressure valve operated by the movements of the pin from its idle position.

In a first embodiment of the invention, the amplifier is also characterised in that the high pressure valve is a non-return valve situated in a passage giving onto the pressure chamber and resiliently urged onto its seat, through which projects one end of a tappet movable in unison with the pin.

The invention will now be described by way of example with reference to the accompanying drawings, in which.

Figure 1:
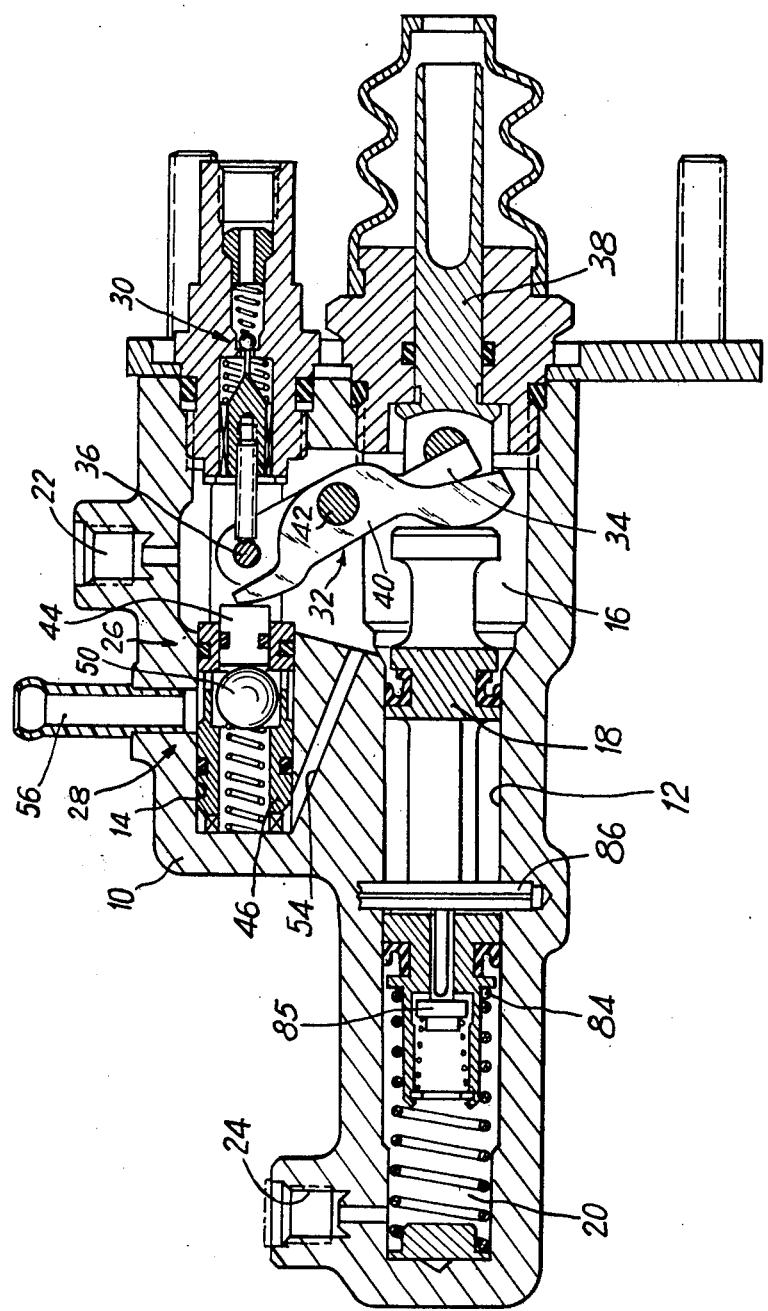
FIG. 1 represents a longitudinal section through a first embodiment of the invention.
Figure 2:
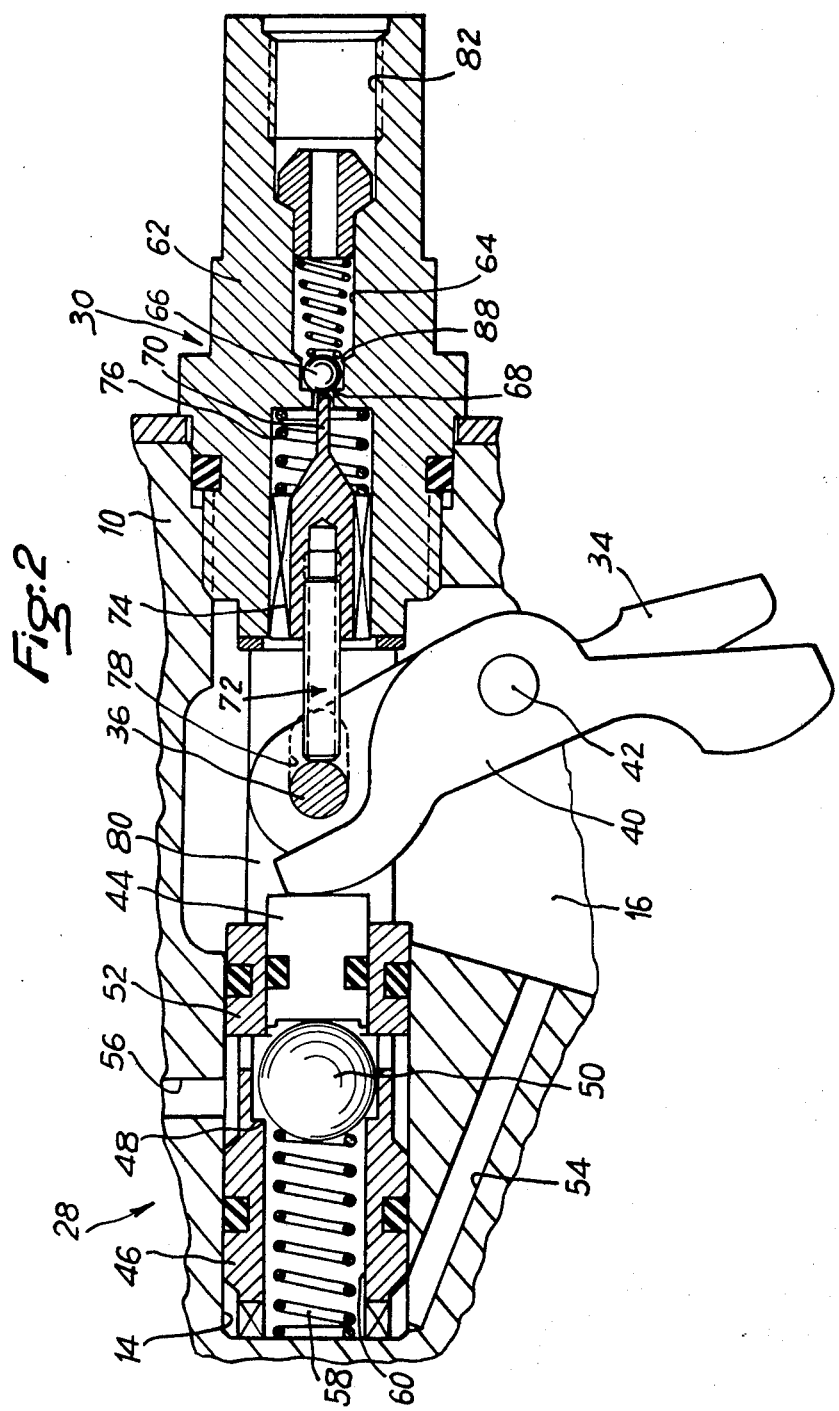
FIG. 2 illustrates the control valve set from FIG. 1 on a larger scale.

The hydraulic amplifier shown in FIGS. 1 and 2 is for use in a power-assisted brake circuit in a motor vehicle. As FIG. 1 shows, the amplifier comprises a housing 10 containing two parallel bores 12, 14 which give onto a chamber 16, termed the pressure chamber. A piston 18 mounted in the bore 12 separates the pressure chamber 16 from a utilization chamber 20 situated at the closed end of the bore 12. The chambers 16, 20 are connectible to two independent sets of brakes in the vehicle by respective orifices 22, 24. Pressurization of the chamber 16 is effected by a set of control valves 26, shown in detail and on a larger scale in FIG. 2. The valve set 26 is formed of an exhaust valve 28 and a high pressure valve 30. The two valves are operated by means of a lever mechanism 32, comprising a lever 34 of which one end is pivoted on a pin 36 associated with the housing and the other end is moved by a control rod 38, which is normally moved by the driver of the vehicle and of which one end projects into the chamber 16. The mechanism 32 also has a rocker member 40 which is pivoted on the lever 32 by means of a pivot 42, and of which the two arms can bear respectively on the end of the piston 18 and on a sliding block 44 belonging to the exhaust valve 28. As FIG. 2 shows, the exhaust valve 28 comprises a first sleeve 46 which is in the end of the bore 14 and of which one end 48 acts as a seat for a ball 50 moved by the sliding block 44. The valve 28 also has another sleeve 52, which is mounted in the open end of the bore 14 and into which the sliding block 44 projects in a fluid-tight manner. The closed end of the bore 14 is connected by a passage 54 to the pressure chamber 16, whereas the central portion of the bore 14 is connected to an exhaust orifice 56 which in turn can communicate with a low-pressure hydraulic fluid reservoir. A spring 58 is provided in a central cavity 60 in the sleeve 46. When the ball 50 is clear of its seat, this cavity allows fluid to flow freely between the exhaust orifice 56 and the passage 54. As FIG. 2 shows, the various elements of the exhaust valve are provided with seals to prevent any leakage between the pressure chamber 16 and the low pressure orifice 56 when the ball 50 is in fluid-tight contact with its seat 48. Lastly, the effective area of the seat 48 equals that of the sliding block 44, so as to balance the exhaust valve.

The control valve set also comprises a high pressure valve 30, mounted in a plug 62 screwed into the main body of the housing 10. The plug 62 contains a central passage 64 which opens directly onto the pressure chamber and which contains a non-return valve 66 normally bearing on its seat 68, through which projects the end 70 of a tappet 72 which is movable together with the pin 36 during operation of the hydraulic amplifier. The tappet 72, which is in two parts screwed together, is slidable in that end of the passage 64 adjoining the pressure chamber 16. A plurality of slots 74 in the tappet 72 allow fluid to flow freely between the seat 68 and pressure chamber 16. A spring 76 bearing on the plug 62 urges the tappet onto the pin 36. The pin 36 is mounted in two parallel slots 78 in two projections 80 integral with the bush 52 of the exhaust valve. When the hydraulic amplifier is inoperative, its various elements occupy the position illustrated in FIGS. 1 and 2. In this case the pin 36 abuts on the ends of the slots 78 and therefore occupies the idle position which is fixed relative to the housing of the hydraulic amplifier. Note that FIG. 2 shows only one of the two projections 80, since the latter are separated by a space in which move the upper portions (in FIGS. 1 and 2) of the lever 34 and rocker member 40. When the amplifier is assembled, the plug 62 cooperates with the two projections by means of a washer so as to position the bush 52 and sleeve 46 in the bore 14. The outer end of the plug 62 comprises a high pressure orifice 82 connectible to a pressure fluid accumulator. To conclude the description of the hydraulic amplifier, the piston 18 is urged into its idle position by a return spring 84. The piston 18 has a central replenishing valve 85, which then occupies an open position and communicates with an annular compartment, connected in turn to the exhaust orifice 56 by a slotted tube 86.

Details of the design and operation of the lever mechanism and of its cooperation with the inlet control rod, piston and exhaust valve may be found in the above-mentioned French patent publication No. 2 164 511.

The hydraulic amplifier just described operates as follows.

When idle, the high pressure valve 66 is in fluid-tight contact with its seat 68, whereas the ball 50 is clear of its seat 48 and therefore allows the pressure chamber 16 to communicate freely with the exhaust orifice 56. When the driver of the vehicle moves the inlet rod 38 into the chamber 16, the lever 34 pivots clockwise on the pin 36, which remains in the position shown in FIG. 2, in which it bears on the ends of the slots 78. In performing this movement the arm 34 carries the rocker member 40 with it, with the result that the ball 50 makes fluid-tight contact with its seat 48 and the piston 18 is moved slightly to the left in FIG. 1, so closing the central replenishing valve and creating a slight pressure in the chamber 20. As the pressure in the chamber 20 increases, the resistance of the piston 18 to being moved becomes such that the rocker member 40 comes to a stop. Further stress exerted on the rod 38 causes the arm 34 to turn on the pivot 42, which remains stationary momentarily so that the pin 36 moves along the slot 78, overcoming the return force exerted by the spring 76. This simultaneous movement of the pin 36 and tappet 72 causes the non-return valve 66 to open and high presure fluid to be admitted to the pressure chamber 16. The pressure rise in the chamber 16 moves the piston 18 to the left in FIG. 1 and therefore moves the pivot 42, whereupon the pin 36 moves to the left in FIG. 1. This results in a series of reciprocating movements of the pin 36 during operation of the hydraulic amplifier until the pressure in the pressure chamber 16 reaches the level desired by the driver of the vehicle, who receives a reaction due to the effect of the pressure in the chamber 16 on the effective cross-section of the end of the inlet rod 38. In the event of a pressure failure, the movement of the pin 36 is sufficient to enable the end of the rod 38 to bear directly on the end of the piston 18, giving direct engagement of the piston by the rod. The latter feature is described in detail in the French patent application published under No. 2 164 511.

The operation of the amplifier just described well illustrates the advantages of the invention. Every time that the hydraulic amplifier is operated, the exhaust valve is moved once and for all onto its seat, and only the high pressure valve reciprocates in response to the relative movements of the piston 18 and inlet rod 38. This feature greatly reduces the risk of leakage between the pressure chamber 16 and exhaust orifice 56. Note that the reliability of closure of the exhaust valve 28 is improved during the period in which the pressure rises in the chamber 16 of the hydraulic amplifier, for the following reason: The structure of the valve 28 and its dissociation from the valve 30 make it possible, during the temporary pressure rise in the pressure chamber, for the establishment of a given pressure in the vicinity of the sliding block 44 to precede the establishment of the same pressure in the vicinity of the ball 50, so that a force arising from this pressure difference also urges the ball 50 into fluid-tight contact with its seat. Without exceeding the scope of the invention, the effective cross-section of the sliding block 44 may be modified to make it exceed that of the seat 48.

In addition the stability of the high pressure fluid supply is improved, as FIG. 2 shows, in that the part of the passage 64 adjoining the orifice 82 has, near the seat 68, a portion 88 whose diameter slightly exceeds that of the ball 66 and whose length substantially equals the diameter of the ball. Also, the flow is further improved by the presence of a conical surface at the free end of the portion 88. The corresponding design, illustrated in FIG. 2, obviously falls within the scope of the invention. This design permits a gradual flow of high pressure fluid when the valve 66 opens, and also prevents fluid hammer from occurring when this valve closes.

Figure 3:
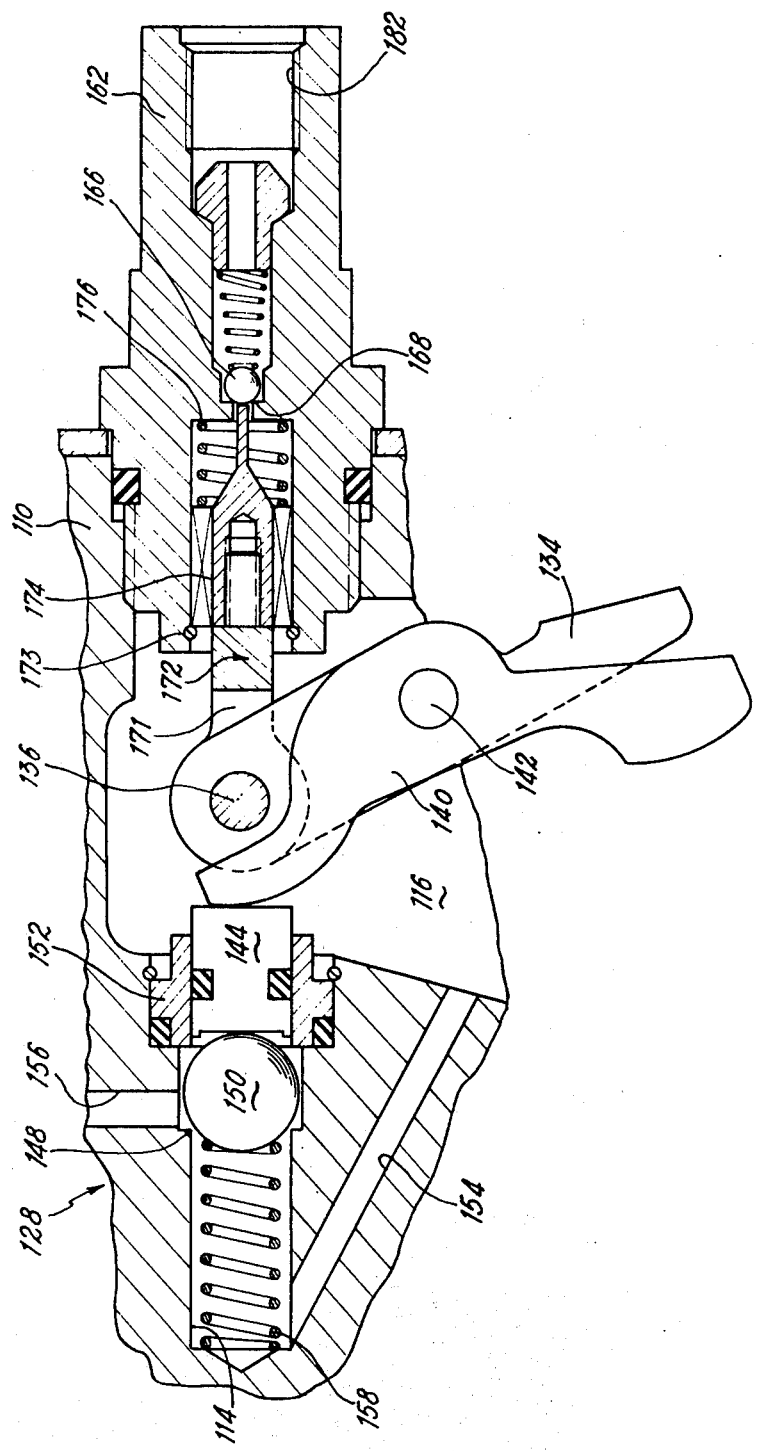
FIG. 3 illustrates the control valve set in a second hydraulic amplifier embodying the invention, on a larger scale.

Without exceeding the scope of the invention, the hydraulic amplifier shown in FIGS. 1 and 2 may be modified according to a design illustrated in FIG. 3. For simplicity's sake elements identical or similar to those already described bear the same reference numeral plus 100.

As FIG 3 shows, the left-hand end of the tappet 172 is a U-shaped member 171 within which the upper portions of the lever 134 and rocker member 140 move, the pivot pin 136 of the lever being limited in its rotation on the two arms of the U. The pin 136 therefore moves with the tappet 172. The latter bears a shoulder capable of bearing on a stop ring 173 attached to the plug 162 when the pin is in the idle position in which it is fixed relative to the housing, as shown in FIG. 3.

What we claim is:

1. A hydraulic amplifier comprising a housing containing a pressure chamber, a servo piston slidable in a bore opening to the pressure chamber, a set of control valves connectible to a pressure fluid source and a low pressure reservoir, respectively, a control rod which is operated by an operator and which projects into the chamber, a lever mechanism situated in the pressure chamber and comprising a lever of which one end is pivoted on a pin associated with the housing and the other end is moved by the control rod and a rocker member which is pivoted on the lever and of which respective ends can bear on the servo piston and can move at least one valve in the control valve set, the pin being slidable relative to the housing and being urged by resilient means into an idle position which is fixed relative to the housing, the control valve set comprising an exhaust valve operated by the rocker member and a high pressure valve separate from the exhaust valve, said high pressure valve being movable with and operable in response to the movements of the pin from its idle position.

2. A hydraulic amplifier comprising a housing containing a pressure chamber, a servo piston slidable in a bore opening to the pressure chamber, a set of control valves connectible to a pressure fluid source and a low pressure reservoir, respectively, a control rod which is operated by an operator and which projects into the chamber, a lever mechanism situated in the pressure chamber and comprising a lever of which one end is pivoted on a pin associated with the housing and the other end is moved by the control rod and a rocker member which is pivoted on the lever and of which respective ends can bear on the servo piston and can move at least one valve in the control valve set, the pin being slidable relative to the housing and being urged by resilient means into an idle position which is fixed relative to the housing, the control valve set comprising an exhaust valve operated by the rocker member and a high pressure valve operated in response to the movements of the pin from its idle position, and the high pressure valve comprising a non-return valve situated in a passage opening to the pressure chamber and resiliently urged onto a seat, through which passage projects one end of a tappet movable together with the pin.

3. A hydraulic amplifier as claimed in claim 2, wherein the exhaust valve includes a bush situated in a bore in the housing, the bush being attached to two projections having two parallel slots, the pin being slidable in the two slots, the resilient means urging the other end of the tappet to bear on the pin to bring the latter into its idle position in which it is fixed relative to the housing and is in contact with the ends of the slots.

4. A hydraulic amplifier as claimed in claim 2, wherein the pin is attached to the other end of the tappet, the tappet including a shoulder capable of bearing on an abutment fixed relative to the housing so as to define the idle position of the pin.

5. A hydraulic amplifier as claimed in claim 2, wherein the tappet is slidable in the passage, and the latter is located in a plug in the housing of the amplifier.

6. A hydraulic amplifier as claimed in claim 2, wherein the non-return valve is a ball mounted in a portion of the passage which is near the seat, and of which the diameter slightly exceeds that of the ball and the length substantially equals the diameter of the ball, a conical surface being provided at the free end of the said portion.

7. A hydraulic amplifier as claimed in claim 1, wherein the high pressure valve is situated in a duct opening to the pressure chamber and the exhaust valve includes a bore opening to the pressure chamber, a passage connecting the pressure chamber to a closed end of the bore, an exhaust valve member substantially situated in the central portion of the bore and capable of bearing in a fluid-tight manner on a seat separating the closed end from the central portion communicating with the exhaust orifice, and a sliding block mounted in a fluid-tight manner between the central portion and the pressure chamber so as to transmit the movements of the adjoining end of the rocker member to the exhaust valve member, the effective area of the sliding block being at least equal to that of the seat of the exhaust valve member.

* * * * *